UNITED STATES PATENT OFFICE.

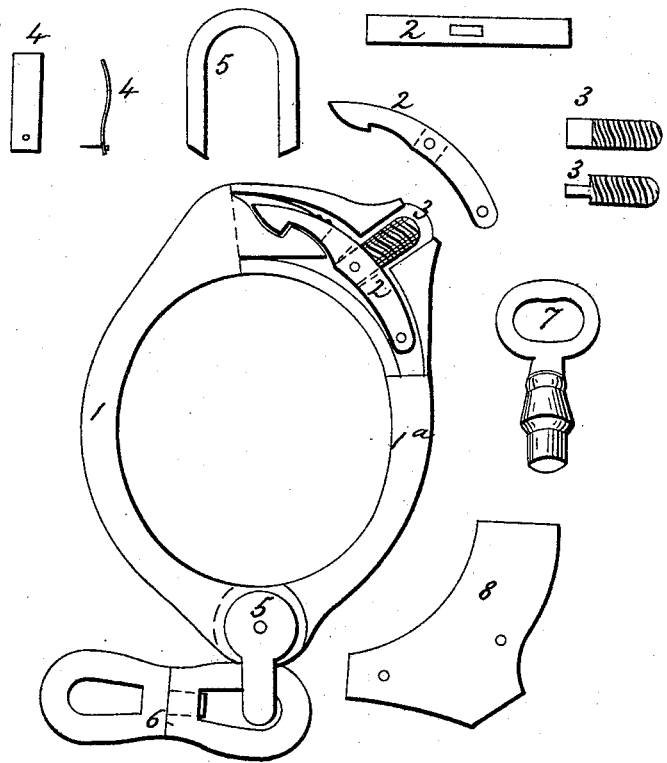

WM. H. KIMBALL, OF AUGUSTA, MAINE.

HANDCUFF.

Specification of Letters Patent No. 29,495, dated August 7, 1860.

*To all whom it may concern:*

Be it known that I, WILLIAM H. KIMBALL, of Augusta, in the county of Kennebec and State of Maine, have invented a new and Improved Handcuff; and I do hereby declare that the following is a full and exact description thereof as shown in the accompanying drawings.

Figures 1 and 1ª represent the principal parts of the handcuff (without the cap or lock plate Fig. 8); Fig. 2, ratchet; Fig. 3, convex draw screw; Fig. 4, ratchet spring; Fig. 5, connection clevis; Fig. 6, connection swivel for connecting two cuffs together; Fig. 7, concave screw key; Fig. 8 lock plate.

Mode of construction and operation: The cuff is constructed by inserting the part (1ª) as shown in the drawings into the part (1) in the form of a rule joint with the clevis (5) to clasp the two sides, which forms a washer on each side of the rule joint. This joint is secured in the clevis by a rivet passing through the clevis and rule joint, and being headed upon each side. The clevis (5) is passed through the swivel (6) before riveting.

Fig. 1ª, as shown in the drawings, has a slot about two inches long at the end opposite the rule joint to admit the lock. The parts of the lock attached to the part (1ª) are composed of a ratchet which is fastened at one end by a rivet passing through the lock plate (8) and through the opposite side of the part (1ª). One end of the ratchet spring (4) is riveted to the outside of the ratchet (2) and the other end presses against the upper side of the slot.

The end of part (1) opposite the rule joint is a ratchet or hook, the outside of which is made to fit the inside of the ratchet (2) and when the cuff is closed the ratchet on Fig. (1) passes into the slot on Fig. (1ª) and the ratchet (2) is thrown into the ratchet on Fig. (1) by the spring (4) pressing against the outside of the slot thereby securing the ends of parts (1) and (1ª) opposite the rule joint together.

A convex draw screw (3) is attached to the ratchet (2) by a tenon on the draw screw which is inserted in a mortise in ratchet (2) and secured by a rivet passing through both, forming a vibrating joint so that in the process of unlocking the draw screw (3) will follow the key (7) while the ratchet (2) is forming a part of a circle. The draw screw is inserted in the key hole, the space outside of and around the draw screw being sufficient to admit the key.

The lock plate (8) is a plane plate corresponding in form to, and covering that part of (1ª) in which the lock is inserted, and is secured to the part (1ª) after the lock is inserted in the slot by brazing and riveting as shown in the drawing.

The swivel (6) is constructed in the usual form, one part being inserted in the other and riveted, and is used for connecting two cuffs together. For this purpose a swivel is used instead of a link as less liable to be broken or twisted off when in use.

The drawings show one half of the cuff, the other half being a duplicate, and fastened in the same manner by a clevis to the other end of the swivel. Each part of the cuff is unlocked by a concave screw key (Fig. 7,) made with a shoulder to prevent its insertion into the key hole beyond the outside edge of the slot. The shoulder of the key resting on the surface of the cuff around the key hole, the key being inserted in the key hole, and operated as a nut upon the draw screw (3), raises the ratchet (2) far enough from the corresponding ratchet on part (1) to allow it to be withdrawn from the part of the lock in (1ª) so that the cuff can be swung open in equal parts opposite the rule joint. When the cuff is open the key can be taken out as it is needed for the purpose of unlocking only, the cuff being a self locking one without the use of the key, one key only being used for both locks.

The cuff is made of first quality malleable iron (except the draw screw, spring, and rivets, which are composed of steel) and is as strong as the common English cuff, weighs about one third less, and being elliptical in form and fitting the wrist, cannot be slipped over the hand.

What I claim as my invention, and desire to secure by Letters Patent is,

1. The cuff so formed as to open opposite the rule joint in equal parts.
2. The ratchet (2) as applied to the cuff.
3. The connection of the draw screw (3) to the ratchet (2) by a vibrating joint.

WILLIAM H. KIMBALL.

Witnesses:
M. CUNNINGHAM,
J. C. VOSE.